ature.com United States Patent [19]

Vong

[11] 4,374,156
[45] Feb. 15, 1983

[54] METHOD FOR OBTAINING A COATING OF A PREFERRED COMPOSITION ON A SURFACE OF A GLASS SUBSTRATE

[75] Inventor: Sandy T. S. Vong, Ann Arbor, Mich.

[73] Assignee: Ford Motor Company, Dearborn, Mich.

[21] Appl. No.: 325,624

[22] Filed: Nov. 30, 1981

[51] Int. Cl.$^3$ .................. B05D 1/12; B05D 3/00; C03C 17/23

[52] U.S. Cl. .................. 427/8; 427/110; 427/160; 427/168

[58] Field of Search .................. 427/8, 110, 160, 168

[56] References Cited

U.S. PATENT DOCUMENTS

| | | | |
|---|---|---|---|
| 3,081,200 | 3/1963 | Tompkins | 117/213 |
| 3,852,098 | 12/1974 | Bloss et al. | 117/106 R |
| 4,182,783 | 1/1980 | Henery | 118/719 X |
| 4,188,199 | 2/1980 | Van Caethem et al. | 427/255 X |
| 4,217,392 | 8/1980 | Vong | 428/232 |
| 4,230,271 | 10/1980 | Marcault | 118/308 X |

FOREIGN PATENT DOCUMENTS 2529076 3/1976 Fed. Rep. of Germany .
2529077 3/1976 Fed. Rep. of Germany .
2529079 3/1976 Fed. Rep. of Germany .

*Primary Examiner*—James R. Hoffman
*Attorney, Agent, or Firm*—William E. Johnson; Olin B. Johnson

[57] ABSTRACT

Methods are disclosed for obtaining a preferred multi-component metallic oxide coating on the surface of a glass substrate by pyrolytic coating techniques. In a pyrolytic coating technique, a heat decomposable, non-homogeneous, dry powder mixture of organic based metallic salts is sprayed against the surface of the glass substrate while the surface is at a temperature in the range from 700° F. (370° C.) to 1200° F. (650° C.). In accordance with the general teachings of this specification, the methods are initiated by selecting a preferred composition for the metallic oxide coating to be developed on the surface of the substrate. Different spraying compositions under a single set of spraying conditions or a single spray composition under different sets of spraying conditions are applied to test substrates to develop test specimens. The chemical composition of the coating developed on the test specimens is determined and the spraying composition or spraying conditions which produced the preferred composition is then selected for use in spraying commercial quantities of a glass substrate.

4 Claims, No Drawings

METHOD FOR OBTAINING A COATING OF A PREFERRED COMPOSITION ON A SURFACE OF A GLASS SUBSTRATE

TECHNICAL FIELD

This invention is directed to a method for obtaining a preferred composition for a multi-component metallic oxide coating on a surface of a glass substrate. The preferred composition for a multi-component metal oxide coating is placed on the surface of the glass substrate by a pyrolytic coating technique in which a heat decomposable dry powder mixture of organic based metallic salts are sprayed against the surface of the glass substrate while that surface is at a temperature in a range from 700° F. (370° C.) to 1200° F. (650° C.). In accordance with preferred teachings of the method of this invention, the dry powder mixture of organic based metallic salts is sprayed against an upper surface of a glass ribbon as that glass ribbon exits from the glass manufacturing process commonly known as the float process.

BACKGROUND ART AND PRIOR ART STATEMENT

I conducted my own patent study on the subject matter of this application in the U.S. Patent and Trademark Office. During that search, I located several patents which will be discussed below. These patents relate generally to pyrolytic coating techniques in which dry powder mixtures of organic based metallic salts are applied to the surface of a glass ribbon either directly or in a vaporized form.

However, none of the patents uncovered in any manner discusses or recognizes the phenomenon that I observed in carrying out a number of tests on the application of dry powder mixtures of organic based metallic salts by pyrolytic coating techniques to the surface of a glass ribbon. The phenomenon that I observed was that if a certain non-homogeneous, multi-component, organic based, metallic salt mixture was applied by pyrolytic techniques to the surface of a glass ribbon, the composition developed on the surface of the glass ribbon depended not primarily upon the composition sprayed but rather upon the spraying conditions. By a non-homogeneous metallic salt mixture I means one in which the individual particles of the mixture are primarily formed of only one of the other components of the multi-component mixture. Such non-homogeneous mixtures may be formed by a simple dry powder mixing operation or a ball milling operation carried out for a short time period. A homogeneous mixture would be one in which the individual particles of the mixture contain all of the components of the multi-component mixture. A homogeneous mixture may be formed in a spray drying operation. It is much cheaper to use a non-homogeneous mixture for spray coating the surface of a glass ribbon.

Thus, a single non-homogeneous spray composition can and does generate a myriad of different compositions on the surface of the glass ribbon depending upon the particular spraying conditions under which the non-homogeneous spray composition was applied. So long as the spray conditions are held uniform, a uniform composition is developed on the surface of the glass ribbon. However, if there is a change in the spray conditions, for example, the angle of the spray with respect to the glass or the distance from the spray gun to the surface of the glass, the composition generated on the surface of the glass will change. The prior art which I uncovered in my search had absolutely nothing to say with respect to this phenomenon.

U.S. Pat. No. 3,081,200 indicates in column 3, at line 13, that powders of organic based metallic salts had been sprayed against the surface of heated glass substrates. No particular data was given and the patent contains absolutely no discussion of the types of compositions generated on the surface of the glass substrate.

Three German patents were also noted. These are German Pat. Nos. 2,529,076; 2,529,077 and 2,529,079. The German Pat. No. 2,529,076 teaches charging of metallic salt particles prior to their application to a glass surface. The glass is preheated to a temperature in the range from 500° C. to 650° C. and the organic based metallic salts are applied to the glass surface. The carrier gas for entraining the salt particles may be preheated. The German Pat. No. 2,529,077 shows a delivery system in which organic based metallic salts are used in pyrolytic glass coating techniques. However, in this case, the finer salt particles are carried to the surface of glass, whereas the larger salt particles are held back. These larger salt particles are partly vaporized and then mixed with the fine salt particles being carried to the surface of the glass sheet. The German Pat. No. 2,529,079 teaches an apparatus in which a cyclone is used to drop large salt particles on a glass surface to be pyrolytically coated. These three patents do not discuss the chemistry of the coating developed on the glass surface being treated and in no manner have they recognized the phenomenon which I have observed and have noted above.

U.S. Pat. No. 3,852,098 is directed to a method for increasing the rate of coating a surface of a glass substrate by using vaporized reactants. In this case, the glass substrate is coated with a metal containing coating by heating the glass and thereafter contacting the hot glass with a gaseous mixture. The gaseous mixture is from 40% to 100% saturated with the vapors of a reactive metal compound. The gaseous mixture is heated by the glass to a sufficient temperature to cause the metal compound to react, thereby depositing the coating on the glass substrate. This patent does not recognize the phenomenon that I have discussed above that a single spraying composition can produce different coating compositions depending on the spray conditions.

U.S. Pat. No. 4,182,783 is directed to a method of vapor deposition of a coating on a glass substrate. In this method, particulate solid coating reactants are fluidized and vaporized by first establishing a fluidized bed of dispersed particulant solid coating reactants and thereafter drawing a volume of fluidized gas and suspended particulate solid coating reactants to a vaporizer. The vaporizer vaporizes the dispersed particulant solid coating reactants in the reactant gas mixture. The reactant gas mixture is then directed into contact with a hot glass substrate to be coated in order to deposit a film thereon. This patent does not undertake a discussion of the chemistry of the compositions developed on the surface of a glass substrate nor does it report the phenomenon which I have reported above.

U.S. Pat. No. 4,188,199 is directed to a process for forming a metal compound coating on a moving glass ribbon. The method comprises the steps of contacting the glass ribbon while at an elevated temperature with a fluid medium containing the reactant chemicals which undergo chemical reaction to form the metal compound on the glass ribbon. Portions of the fluid medium are discharged against the glass ribbon in stream formations which have a velocity component in the direction of movement of the glass ribbon and a velocity component which is inclined to the surface of the glass ribbon so that a selected angle is formed between the spray and the glass ribbon. This patent does not undertake any discussion of the relationship between the composition of the coating generated on the surface of the glass ribbon and the particular conditions under which that coating is applied. The patent does not discuss the phenomenon which I have reported on above.

U.S. Pat. No. 4,230,271 is directed to an apparatus for evenly and uniformly depositing particulates suspended in a gas on at least one surface of a glass substrate. The device is designed to provide a uniform application of material on a substrate. Once again this patent does not undertake a discussion of the relationship between the coating composition generated on a glass substrate and the particular conditions under which the coating was applied.

DISCLOSURE OF THE INVENTION

This invention is directed to a method for obtaining a coating on the surface of glass substrate and, more particularly, to a method for obtaining a preferred multi-component metallic oxide coating on a surface of a glass substrate by pyrolytic coating techniques. A pyrolytic coating technique is one in which a non-homogeneous, heat decomposable dry powder mixture of organic based metallic salts is sprayed against the surface of the glass substrate while the surface is at a temperature in the range of from 700° F. (370° C.) to 1200° F. (650° C.). The method of my invention is as follows:

A preferred composition for a multi-component metallic oxide coating is selected for the surface of the glass substrate. By a preferred composition, I mean one which will in a particular multi-component system exhibit the best physical and chemical durability for that system. As will be described later, each system has a preferred range of specific elements in the final coating in order to get the best chemical and physical durability for the coating composition. By a multi-component coating composition, I mean a coating on the glass substrate which has at least two metallic oxide components.

In accordance with one embodiment of my method, a plurality of test samples of a non-homogeneous, dry powder mixture are formed. Each sample has a different composition of the multi-component, organic based, metallic salts. Individual glass substrates are sprayed under identical conditions with the individual test samples of the dry powder mixture. In this manner there is formed a plurality of coated test specimens. Each coated test specimen will be sprayed under identical conditions but with a different starting non-homogeneous, dry powder mixture and thereby will have on its surface a different composition of a multi-component metallic oxide coating. Each of the coated test specimens is analyzed to determine the chemical composition of the coating thereon. Thereafter, a determination is made as to which coated test specimen has a coating thereon of the preferred composition, that is, a coating composition of multi-component metallic oxide which exhibits the best chemical and physical durability for that multi-component system.

After the determination has been made, commercial quantities of glass are sprayed under the same operating conditions used to spray the test specimens. The commercial spraying is carried out using the non-homogeneous, dry powder mixture having the composition which produced the preferred composition on the coated test specimen.

As an alternative embodiment of my method, a single, non-homogeneous, dry powder mixture may be prepared having a selected composition of the multi-component, organic based, metallic salts therein. This single composition is sprayed under a plurality of different conditions. For example, spray gun height and spray gun angle are changed while the selected composition is sprayed onto a plurality of glass substrates in order to form a plurality of coated test specimens. Each of the coated test specimens will have a different composition of metallic oxide coating thereon because the spraying condition for each coating operation was different although the sprayed composition was the same.

Once again, each of the coated test specimens is analyzed to determine the chemical composition of the coating thereon and a determination is made as to which test specimen has the preferred coating composition thereon. Once this determination has been made, then commercial quantities of glass are sprayed under operating conditions which produced the preferred composition on the coated test specimen. The powder composition used for spraying is the selected composition used in spraying all of the glass substrates in order to produce the test specimens, but the spraying conditions used are those which produce the test specimen having the preferred composition coating thereon.

BEST MODE AND INDUSTRIAL APPLICABILITY

The novel features that are considered characteristic of the invention are set forth with particularity in the appended claims. The invention itself, however, both as to its determination and its method of operation, together with additional objects and advantages thereof, will best be understood from the following description of specific embodiments.

The following description is what I consider to be a preferred embodiment of my method of obtaining a desired multi-component metallic oxide coating on the surface of a glass substrate. The following description also sets forth what I contemplate to be the best mode of carrying out the method of this invention. This description is not intended to be a limitation upon the broader principles of this method and, while preferred materials are used to illustrate the method in accordance with the requirements of the patent laws, it does not mean that the method is operative only with the stated materials as others may be substituted therefor.

Also, for example, the method disclosed herein may be successfully utilized with materials yet to be developed by skilled artisans, such as new, non-homogeneous, organic based metallic salts which are heat decomposable. It is therefore contemplated by me that the method disclosed in this specification may also be successfully used with materials yet to be developed because the principles of operation of the method remain the same, regardless of the particular materials subjected to the method or used with the method.

Before discussing the preferred embodiment of the method of my invention, I would like to make reference to my previously issued U.S. Pat. No. 4,217,392, which claimed a coated glass article. In that patent I indicated that certain improved chemical and physical properties may be achieved in a multi-component metallic oxide coating on a glass substrate if the proportion of the elements making up the coating fell within a particular relationship disclosed in that patent. The spray system involved was one which generated a coating on the glass substrate containing chromium oxide, cobalt oxide and iron oxide. That particular patent dealt with the development of such a coating composition from a process in which the organic compounds of the desired metallic materials were dissolved in an organic solvent and a solution spray was applied to the glass substrate.

Using dry spray ingredients, as taught in this specification, I find that there is still some preferred relationships between the three mentioned metallic oxide materials in the coating composition, but there is a slight shift in the preferred compositions when dry, non-homogeneous, powder mixtures of metallic salts are used. For example, I have now found that a greater amount of chromium oxide may be present in the preferred coating film, somewhere upwards of 10%. I have not yet been able to determine exactly why a greater amount of chromium oxide is tolerated in a coating composition produced by dry spray than in a coating composition produced by a solvent spray operation.

As discussed in the mentioned U.S. Pat. No. 4,217,392, chemical and physical durabilities are measured by two separate tests. Chemical durability is measured by a first procedure in which a coated sample is subjected to a five hour hydrochloric acid vapor test. In this case, hydrochloric acid vapors surrounded the material and attempt to attack the coating on the glass. An attack of the coating changes the level of transmission of visual wavelength energy through the glass. There is a greater amount of energy transmitted as the durability of the film is attacked. The change in transmission characteristics of the coated glass to the transmission of energy therethrough is considered acceptable if it is in a range of 15% or less, any greater change of the film being considered unacceptable.

The second test is a test of physical durability. In this test the sample is initially heat tempered. Thereafter, the tempered test sample is subjected to a humidity test in which the sample is subjected to a 100% humidity at 120° F. (66° C.) for a period of six weeks. The high humidity can cause the coating on the surface to loosen its adherence to the surface and come free. The measurement of durability is that the surface coating stays in place for the prolonged period of time and no less than 1% of the coating is removed therefrom. If any greater amount of material is removed, the sample is rejected as failed.

First Embodiment

A first embodiment of the method of my invention is carried out as follows. A preferred composition for a multi-component metallic oxide coating for a surface of a glass substrate is selected. I have found that a coating composition consisting of 9.5% chromium oxide; 18% iron oxide, with the balance cobalt oxide has excellent chemical and physical durability characteristics as it passes both the acid test and the humidity tests set forth above. Therefore, in this first embodiment I selected that composition as being the preferred coating composition.

The next step in my method is to form a plurality of test samples of a dry, non-homogeneous, powder mixture which is to be used in the pyrolytic coating technique. Each sample has a different composition of the multi-component organic based metallic salts. In accordance with this preferred teaching, four dry powder mixtures were formed. The four mixtures are as follows, each being based on the amount of a particular organic based metallic salt present. In each case the metallic salt is an acetyl acetate salt. Mixture 1: 80% cobalt, 10% iron and 10% chromium; Mixture 2: 78% cobalt, 10% iron and 12% chromium; Mixture 3: 76% cobalt, 12% iron and 12% chromium; and Mixture 4: 74% cobalt, 14% iron and 12% chromium.

Each of the mixtures 1–4 were sprayed under identical conditions against individual test specimens of a glass substrate. The test conditions were that the gun was located at an angle of 45° with respect to the surface of the test specimen and that the distance from the gun to the substrate was 9.5 inches (21.5 centimeters). In this manner, four different test specimens were formed and each specimen had a different coating composition of metallic oxide coating thereon.

Each of the coated test specimens was analyzed to determine the chemical composition of the coating thereon. It was found that the coated test specimen coated by Mixture No. 3 had a coating composition thereon of 18% iron oxide, 9.5% chromium oxide, with the balance being cobalt oxide, the preferred composition desired. Thus, the third mixture produced the sample having the desired composition which will pass the acid test and the humidity test mentioned above.

After this determination was made, commercial quantities of glass were sprayed under the same spraying conditions used to spray the test samples, that is, the 45° angle and 9.5 inches spacing. The mixture No. 3 was used in the commercial operating process so that the resulting glass had developed thereon a coating composition of the preferred composition.

Second Embodiment

In the second embodiment of the method of my invention, a single, non-homogeneous, powder composition was used for spraying four different test specimens, but different angles and distances between the test specimens to be sprayed and the spraying nozzle were used. The different conditions for the spray operation resulted in the production of different coating film compositions. In this situation, the non-homogeneous spray mixture used was that of Mixture No. 3 from the first embodiment of my method. In the new testing, Test 1 was at an angle of 60° with a spacing of 13 inches; Test 2 at an angle of 45° with 13 inches spacing; Test 3 at a 60° angle with a 9.5 inches distance, and Test 4 at a 45° angle with a 9.5 inch spacing. Thus, the four test specimens were generated using a single spraying composition but different spraying conditions. Example 1 produced a film composition which was characterized in that it contained 36.6% oxide, 9.6% chrome oxide, with the balance being cobalt oxide. Test No. 2 produced a film composition characterized in that it contained 30.9% iron oxide, 10.5% chrome oxide, with the balance being cobalt oxide. Test No. 3 produced a film composition characterized in that it contained 36.8% iron oxide, 10.0% chrome oxide, with the balance being cobalt oxide. Test No. 4 produced the desired preferred film composition of 18% iron oxide, 9.5% chromium, with the balance being cobalt oxide. This film composition passes the acid test and the humidity test set forth above.

While particular embodiments of the invention have been illustrated and described, it will be obvious to those skilled in the art that various changes and modifications may be made without departing from the invention and it is intended to cover in the appended claims all such modifications and equivalents as fall within the true spirit and scope of this invention.

What is claimed is:

1. A method for obtaining a preferred multi-component metallic oxide coating on a surface of a glass substrate by pyrolytic coating techniques in which a heat decomposable, non-homogeneous, dry powder mixture of organic based metallic salts are sprayed against said surface of said glass substrate while said surface is a temperature of at a range from 700° F. to 1200° F., which method comprises the steps of:

selecting a preferred composition for a multi-component metallic oxide coating for said surface of said glass substrate;

forming a plurality of testing samples of said non-homogeneous, dry powder mixture, each sample having a different composition of said multi-component organic based metallic salts;

spraying under identical condition individual test specimens of glass substrates with individual test samples of said dry powder mixture, thereby to form a plurality of coated test specimens, each coated test specimen having a different composition of a metallic oxide coating thereon;

analyzing each of said coated test specimens to determine the chemical composition of said coating thereon;

determining which coated test specimen has a coating thereon of said preferred composition; and spraying commercial quantities of glass under the same spraying conditions used to spray said test specimens, said commercial spraying being carried out with the dry powder mixture having the composition which produced said preferred composition on said coated test specimen.

2. A method for obtaining a preferred multi-component metallic oxide coating on a surface of a glass substrate by pyrolytic coating techniques in which a heat decomposable, non-homogeneous, dry powder mixture of organic based metallic salts are sprayed against said surface of said glass substrate while said surface is at a temperature in the range from 700° F. to 1200° F., which method comprises the steps of:

selecting a preferred composition for a multi-component metallic oxide coating for said surface of said glass substrate;

forming a non-homogeneous, dry powder mixture of said multi-component organic based metallic salts;

spraying under varying conditions individual test specimens of glass substrates with said test sample of said dry powder mixture thereby to form a plurality of coated test specimens, each coated test specimen having a different composition of a metallic oxide coating thereon;

analyzing each of said coated test specimens to determine the chemical composition of said coating thereon;

determining which coated test specimen has a coating thereon of said preferred composition; and spraying commercial quantities of said glass under the same spraying conditions used to spray said test specimen which had said coating thereon of said preferred composition, said spraying operation being carried out with the dry powdered mixture used for spraying the test specimens.

3. The method of claim 1 or 2, in which said organic based metallic salts are acetyl acetate salts.

4. The method of claim 1 or 2, in which said preferred composition is one in which said metallic oxides are cobalt oxide, iron oxide and chromium oxide.

* * * * *